No. 669,637. Patented Mar. 12, 1901.
J. HARGREAVES.
PROCESS OF MAKING CHLORATES.
(Application filed Dec. 20, 1897.)
(No Model.) 2 Sheets—Sheet 2.
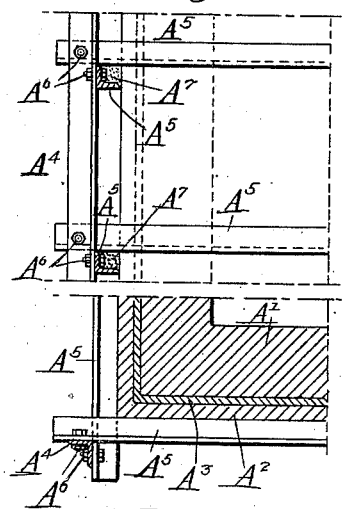
*Fig. 6.*
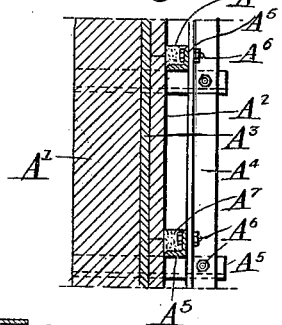
*Fig. 7.*
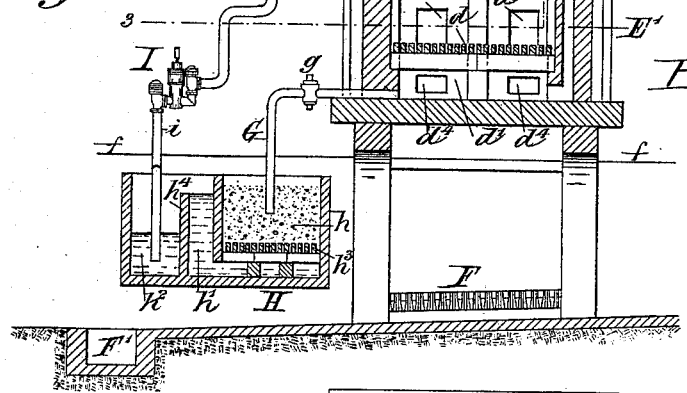
*Fig. 2.*
*Fig. 8.*
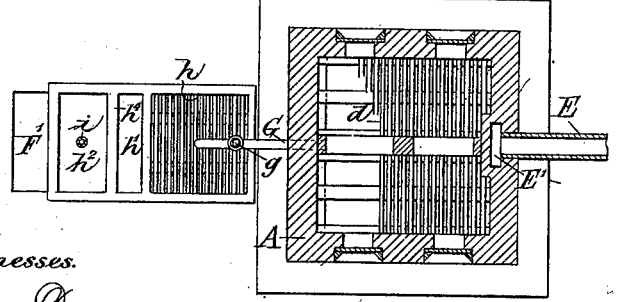
*Fig. 3.*
Witnesses.
Matthew Downes.
Hugh Ewing
Inventor:
James Hargreaves

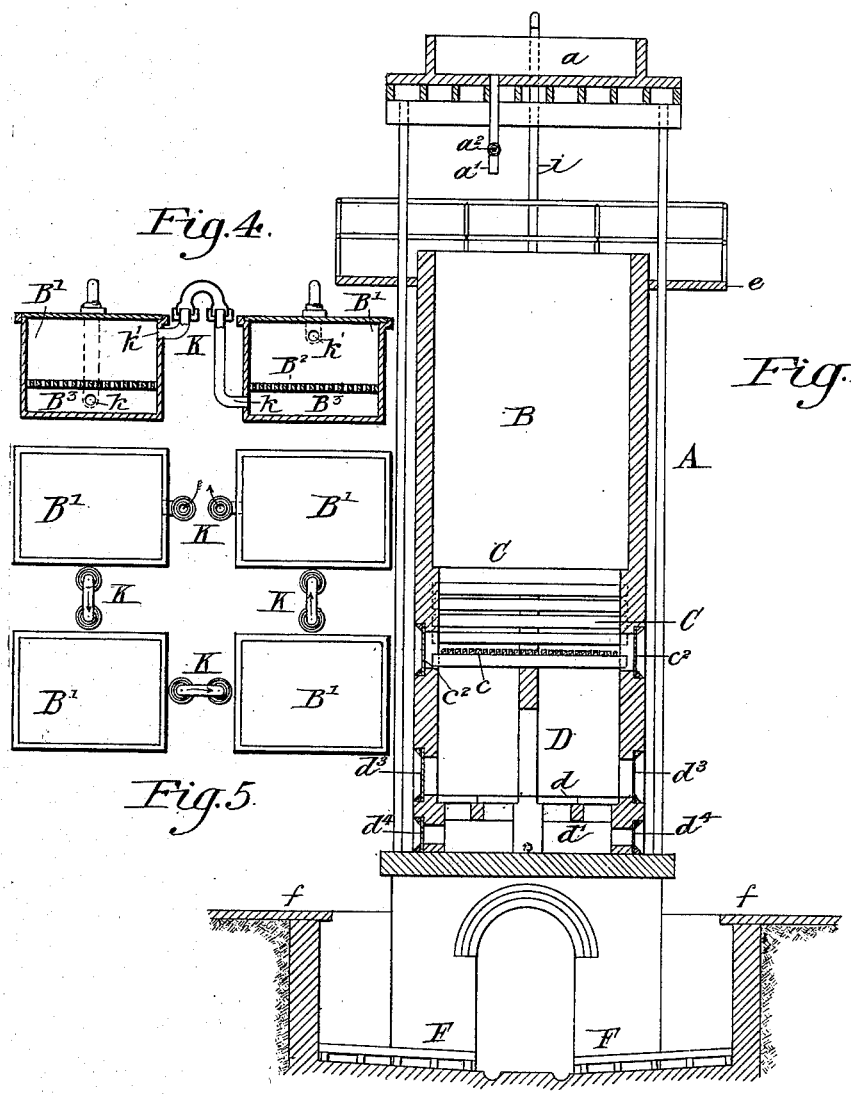

UNITED STATES PATENT OFFICE.

JAMES HARGREAVES, OF FARNWORTH-IN-WIDNES, ENGLAND, ASSIGNOR TO THE GENERAL ELECTROLYTIC PARENT COMPANY, LIMITED, OF SAME PLACE.

PROCESS OF MAKING CHLORATES.

SPECIFICATION forming part of Letters Patent No. 669,637, dated March 12, 1901.

Application filed December 20, 1897. Serial No. 662,684. (No specimens.)

*To all whom it may concern:*

Be it known that I, JAMES HARGREAVES, a subject of the Queen of Great Britain and Ireland, residing at Farnworth-in-Widnes, in the county of Lancaster, England, have invented certain new and useful Improvements in the Manufacture of Chlorates and in Means and Appliances Therefor, (in respect whereof I have obtained Letters Patent in Great Britain, No. 16,257, dated August 30, 1895; in France, No. 256,872, dated June 2, 1896; in Belgium, No. 122,045, dated June 18, 1896; in Germany, No. 92,474, dated June 23, 1896, and in Austria, No. 46/4,569, dated November 14, 1896,) of which the following is a specification.

This invention relates to the manufacture or production of chlorates by subjecting raw materials—such as soda, which may be in the form of carbonate, and the like—to the action of chlorin in such a manner that the more soluble salts become dissolved, while the less soluble salts remain unaffected.

My improvements consist, mainly, first, in exposing the materials used in the manufacture of chlorates to the action of chlorin in the manner herein set forth, (the said materials when chlorinated being for brevity's sake and for the purpose of this specification called "chlorinated products,") and, secondly, in subjecting the said chlorinated products to systematic, limited, and selective lixiviation, which shall dissolve the more soluble salts and leave the less soluble salts undissolved. The materials used are preferably such as shall be the most economical, having regard also to the cost of labor and fuel to be employed in obtaining the finished merchantable chlorates.

The method of carrying my said invention into effect may be varied in such a manner as to be adapted to the chemical and physical properties of the materials under treatment.

The accompanying drawings illustrate apparatus adapted for use in carrying my invention into effect.

Figure 1 is a vertical section of an absorbing-tower arranged for employment in the production of chlorate of soda in which the materials are exposed to the action of chlorin and in which the systematic limited selective lixiviation hereinbefore referred to is accomplished. Fig. 2 is a vertical section taken at right angles to Fig. 1. Fig. 3 is a horizontal section on the line 3 3 in Fig. 2. Fig. 4 is a vertical section, and Fig. 5 a corresponding plan, illustrating an alternative method of carrying out my invention with the use of a series of chambers or vessels instead of an absorbing-tower. Figs. 6, 7, and 8 are enlarged detail views illustrating an inexpensive method of constructing the absorbing-tower, Fig. 6 being an elevation of a portion of the tower, Fig. 7 a vertical section, and Fig. 8 a horizontal section.

In the manufacture of chlorate of soda the soda required can be obtained at a low cost, and hence there is not as much economy effected in the cost of raw materials as will compensate for the extra cost of fuel and labor required for separating the chlorate of soda from calcium salts. Therefore when making chlorate of soda I take soda, preferably in the form of carbonate, and add sufficient water thereto to form a hydrated carbonate. The said soda may be made into a pasty mass or into solid form, or it may be used in granular or crystal form or in such other forms or conditions as will permit of easy permeation by chlorin. The mass of soda is then charged into an absorbing-tower A, built of stone, brick, or similar material, the said soda being charged at the upper part, while the chlorinated products and the sodium chlorid are discharged at the lower part, of the said absorbing-tower. B is the chamber into which the soda is charged. The lower part of the chamber is furnished with transverse bearers C, preferably of prismatic form, so arranged as to permit the materials to descend gradually and freely, while allowing free circulation of gas, the function of these bearers being to hold up the materials and only allow the sodium chlorid to fall into the chlorinating-chamber D when the chlorinating is almost or entirely complete. Additional adjustable bearers c may be placed below the bearers C if it be found that the material passes too rapidly. The chlorin is admitted to the chamber D by the pipe E and flue E', the gas passing partly into the compartment $d'$ and through the grid $d$ into the chamber D and partly over the wall $d^2$ of the flue into the chamber D, where it acts upon any undecomposed soda remaining in the sodium chlorid falling from the bearers C. During the working of the apparatus the salt or sodium chlorid which remains undissolved in the chlorate liquor is collected in the chamber D, whence it may be periodically withdrawn through openings $d^3$, provided with doors, and removed to the floor F, where it is allowed to drain, the liquor therefrom running into the trough or gutter F'. The chlorate liquor issues from the compartment $d'$ by way of the pipe G, provided with a regulating-cock $g$, and passes into a saturating-tank H. This tank is divided into three compartments $h\ h'\ h^2$. The compartment $h$ is charged with pieces of soda, which rest on a grid or perforated bottom $h^3$, the pipe G dipping well into the mixture of soda and chlorate liquor in order to prevent the escape of chlorin gas, while the pieces of soda absorb any excess of free chlorin present in the liquor. The said chlorate liquor then passes into the compartment $h'$ and thence over the partition $h^4$ into the compartment $h^2$. The liquor may now be conducted to concentrating-pans and treated in the usual manner, or it may be raised by means of a suitable pump I (a stoneware pump of the well-known Doulton type being the most suitable for the purpose) and delivered by way of the pipe $i$ into the tank $a$ and a portion used in assisting to dissolve the undecomposed soda in the upper part of the chamber B. The liquor is allowed to flow from the tank $a$ in a limited degree by way of the pipe $a'$, furnished with a regulating-cock $a^2$. Any small particles of soda which may have come along with the liquor fall to the bottom of the tank $a$ and are carried through the pipe $a'$ to the chamber B. A hose or other suitable appliance (not shown) may be attached to the pipe $a'$ for spraying the undecomposed soda with the liquor.

$b$ is a pipe for conveying the liquor from the tank $a$ to the concentrating-pans.

$e$ is a stage from which the chamber B may be charged and inspected.

$f$ is the floor ordinarily used when discharging the chamber D.

The liquor in the gutter F', resulting from the draining of the insoluble salt or sodium chlorid, may be transferred to the compartment $h^2$ and conveyed thence, with the chlorate liquor, into the tank $a$.

By subjecting the chlorate liquor to successive passages through the charge of soda in the chamber B soda possessing a lower degree of hydration may be used. Moreover, with such a method of working a much stronger liquor is produced, with the result that the proportion of insoluble sodium chlorid yielded in the chamber D is increased. The cost incidental to concentration is hereby reduced, and the amount of the salt which usually has to be eliminated from the concentrating-pans is minimized.

Openings $c'\ c^2$, which may be closed by glazed doors, are provided for enabling the working to be inspected and also for permitting the insertion of tools for breaking any hard lumps of soda. Through the openings $c^2$ the operator can regulate the adjustable bearers $c$. $d^4$ represents similar glazed openings for inspecting the compartment $d'$ and removing therefrom any sodium chlorid that may find its way through the grid $d$.

Ordinary soda crystals may be used in the absorbing-chambers, or the soda may be prepared in the following manner: The dilute liquors resulting from washing the chlorate out of the salt may be employed for hydrating the soda. The latter in the form of soda ash is ground under "edge runners" and mixed in about the proportion of one hundred parts with one hundred or one hundred and fifty parts of weak liquor, by weight, the mixture then being set aside to solidify. The quantity of water used may be varied. Where only a small proportion of water is used, the progress of the reaction is slow and a larger absorbing-space is necessary. The chlorate liquors resulting are, however, stronger in chlorate and will be found to contain a smaller proportion of sodium chlorid. When using soda in its less hydrated form, it is preferred to cause a portion of the chlorate liquor to pass again through the soda in the absorbing-chamber B. The salt removed from the chamber D after having been allowed to drain may be transferred to a centrifugal hydro-extractor, steam and hot water being caused to pass therethrough. The "fishings" of salt obtained from the concentration of the chlorate liquor are washed with hot unconcentrated chlorate liquor, allowed to drain, and then they may be treated for the extraction of the remaining chlorate in the same manner as described for treating the salt taken from the chamber D.

Instead of employing an absorbing apparatus, as above described, I may use a series of vessels or chambers, such as B', Figs. 4 and 5, through which the chlorin is caused to pass in succession until all the available chlorin is absorbed. The said chambers or vessels B' are provided with luted gas connections K, so that when the contents of one of the said chambers or vessels are sufficiently chlorinated the chlorinated products may be withdrawn and the said chamber or vessel recharged with raw materials, the vessel thus recharged being made the last in the series. The chambers may be fitted with shelves or other devices for increasing the surface exposed to the action of chlorin, or any of the numerous suitable forms of evolving absorbing chambers or vessels may be employed.

In Fig. 4 I have shown the chambers as provided with a false bottom or grid B², whereon the materials to be treated rest. The chlorin enters the open space B³ by way of the opening $k$ and after percolating the mass of soda passes out at the opening $k'$ through the luted connecting-pipe K to the next chamber of the series. The chlorinated products may be pumped from one vessel to the next vessel of the series.

Carbonate of soda, as herein set forth, is found to be the most practicable form of soda for the purpose of this invention; but it will be understood that caustic soda or bicarbonate of soda may be employed.

It is at times advantageous to moisten the chlorin and raise the temperature of the raw materials with a view to rendering the reaction more rapid. For this purpose a current of steam may be admitted at any suitable part of the chamber B. If in consequence of the too-sudden absorption of chlorin the temperature is too high, the mass may be cooled by any suitable refrigerating appliances or by admission of air or other diluting gas.

The method of applying the systematic limited selective lixiviation may be varied according to the solubility of the chlorate and of the secondary products with which the said chlorate is mixed. Where the chlorate is the more soluble salt, as is the case when manufacturing chlorate of soda, I cause the lixiviating liquid to pass in a limited quantity through a series of vessels or through a very deep vessel charged with the chlorinated products, the latter allowing of a deep layer of material, through which the fluid passes, whereby the more soluble chlorate is taken into solution, while the less soluble materials are left undissolved or deposited. Any excess of chlorin held in solution at the end of the first lixiviation passes through the soda contained in the tank H, whereby the solution is further enriched with chlorate of soda. As the liquid is repeatedly passed through the materials in the vessels it becomes more and more saturated with chlorate, while much of the sodium chlorid which has been taken into solution is again thrown out of solution, so that the solution becomes very rich in chlorate of soda with a comparatively small proportion of sodium chlorid.

Lixiviation and chlorination, as herein described, may be conducted at a high temperature; but I have found that on the whole it is not advantageous to heat the chambers when making chlorate of soda. The temperature should not be so high as to liberate much oxygen. I remove the latter traces of chlorate remaining among the undissolved sodium chlorid by use of hydro-extractors or other suitable means.

The chlorate of soda contained in the solution obtained as aforesaid is refined by concentration, the mother-liquor or the salts therefrom being returned to the lixiviating vessels.

In effecting the aforesaid systematic limited selective lixiviation I do not confine myself to any particular method of bringing the said chlorinated products and the lixiviating fluid into contact. When the said chlorinated products are sufficiently porous, I lixiviate by filtration, and when they are practically impervious I lixiviate by successive washings and allow the undissolved salts to settle. When working with a series of vessels, I use the liquid from one lixiviating vessel to wash the chlorinated products in another vessel which has been more recently charged, and thus take up the more soluble salt in greater quantity at each succeeding vessel and at the same time cause the precipitation of less soluble salts.

The herein-described methods of applying my said invention are given as examples only. The same methods may be applied in the manufacture of other chlorates—such, for instance, as the chlorates of lime, of magnesia, and of baryta.

To economize fuel, I use the mother-liquors remaining from the crystallization of the previous charges of chlorates to supply the water used for the hydration of the carbonate of soda, magnesia, lime, or other of the raw materials aforesaid before submitting the said raw materials to chlorination.

It will be understood that the herein-described methods of converting soda into chlorate may be reversed, provided the cost of the materials be favorable to such course, the sodium chlorid being mixed with lime and then converted into chlorate of soda.

In Figs. 6, 7, and 8 I have illustrated an economical method of constructing and bracing the absorbing tower or chamber. A wall A' of brick is inclosed by slabs of slate A², a filling of cement A³ occupying the space between the brick and the slate. The bracing is accomplished by means of angle-iron A⁴ A⁵, secured by bolts A⁶, preferably arranged as shown in Figs. 6 and 7, the angle-irons A⁵ centering over the joints of the slate slabs A² and having their inner angles filled with cement A⁷. A firm gas-tight bedding is thus presented at the junction of the slate slabs.

What I claim as my invention, and desire to secure by Letters Patent, is—

1. The herein-described method of manufacturing chlorate of soda, same consisting in hydrating carbonate of soda crystals, constituting the same into a mass of such a character as to permit of easy permeation by the chlorin, charging the mass of hydrated carbonate of soda into an absorbing-tower, and passing chlorin through the said hydrated soda; the soluble salt or chlorate being taken into solution and conducted away while the insoluble salt is left undissolved.

2. The herein-described method of manufacturing chlorate of soda, same consisting in hydrating carbonate of soda crystals, constituting the same into a mass of such a character as to permit of easy permeation by the chlorin, charging the mass of hydrated carbonate of soda into an absorbing-tower, passing chlorin through the said hydrated carbonate of soda, then passing the chlorate solution through a quantity of pieces of soda and ultimately recovering the chlorate of soda from the chlorate liquor in the usual manner.

JAMES HARGREAVES.

Witnesses:
MATTHEW DOWNES,
HUGH EWING.